United States Patent [19]
Onda et al.

[11] 3,847,476
[45] Nov. 12, 1974

[54] SHUTTER ASSEMBLY HAVING MEANS FOR PREVENTING REBOUNDING OF THE SHUTTER BLADES

[75] Inventors: Eiichi Onda, Misato; Mitsuo Koyama; Tadashi Nakagawa, both of Chiba, all of Japan

[73] Assignee: Seiko Koki Kabushiki Kaisha, Tokyo, Japan

[22] Filed: Aug. 23, 1973

[21] Appl. No.: 390,723

[30] Foreign Application Priority Data
Aug. 23, 1972   Japan.............................. 47-97667

[52] U.S. Cl. ............................................. 354/252
[51] Int. Cl. ............................................. G03b 9/20
[58] Field of Search .......... 95/53 R, 55, 58, 59, 60; 354/252

[56] References Cited
UNITED STATES PATENTS

| | | | |
|---|---|---|---|
| 2,975,689 | 3/1961 | Chatani.................................. | 95/55 |
| 3,580,156 | 5/1971 | Loseries................................ | 95/60 |
| 3,628,438 | 12/1971 | Loseries................................ | 95/55 |
| 3,683,778 | 8/1972 | Weiss..................................... | 95/60 |

Primary Examiner—Samuel S. Matthews
Assistant Examiner—Russell E. Adams, Jr.
Attorney, Agent, or Firm—Robert E. Burns; Emmanuel J. Lobato; Bruce L. Adams

[57] ABSTRACT

A shutter assembly has a plurality of shutter blades divided in a shutter-opening blade group and a shutter-closing blade group. A shutter actuating mechanism independently actuates both groups of shutter blades to effect opening and closing of a shutter aperture and the actuating mechanism comprises a first set of generally parallel actuating levers connected to the shutter blades of the shutter-opening blade group by means of a pin-and-slot connection so that pivotal movement of the first set of actuating levers effects opening of the shutter aperture. A second set of generally parallel actuating levers is connected to the shutter blades of the shutter-closing blade group in a similar manner so that pivotal movement of the second set of actuating levers effects closing of the shutter aperture. One lever from each set of actuating levers has a flexible portion and a fixed projection is disposed along the path of travel of each of the flexible portions to make sliding engagement therewith. The relative positions of the fixed projections and the flexible portions are such that during movement of the shutter blades to effect either opening or closing of the shutter aperture, the corresponding flexible portion engages with and rides over one of the stationary projections causing momentary flexure of the flexible portion accompanied by momentary pressing of the shutter blades against a stationary plate to thereby absorb the kinetic energy of the shutter blades and effectively attenuate their rapid movement of the shutter blades.

4 Claims, 4 Drawing Figures

SHUTTER ASSEMBLY HAVING MEANS FOR PREVENTING REBOUNDING OF THE SHUTTER BLADES

The present invention relates generally to camera shutters and more particularly relates to a camera shutter assembly having means for preventing rebound of the shutter blades during the taking of an exposure.

Cameras employing shutter assemblies of the moveable blade type are in wide use today and such cameras employ a plurality of shutter blades which are moveable to open and close a shutter aperture to effect an exposure. During the opening movement and the closing movement of the shutter blades, the blades move at high speed and it is necessary to completely stop the motion of the blades at a preselected stop position in order to obtain an accurate exposure. If the high speed motion of the shutter blades is not properly attenuated, the blades will continue past their intended stop position or rebound back from their stop position to again partially open the shutter aperture whereupon reexposure of the film occurs. Moreover, the shock imparted to the shutter assembly by the rebounding action of the shutter blades detrimentally affects the operating life of the camera and the accuracy of the shutter assembly is severely lessened.

One technique that has heretofore been used to prevent occurrence of such phenomena is to provide a narrow groove in which the shutter blades enter upon completion of their movement and the narrow groove engages with the shutter blades and stops them at the intended stop position by a wedging action. However this technique has not proven to be successful since additional space is needed to accommodate the grooved member and though the narrow groove effectively stops the shutter blades at the intended stop position, considerable energy must be expended to release the wedged shutter blades from the groove and thus a carefully calibrated device must be employed to supply the necessary torque to remove the wedged shutter blades from the groove. Moreover, a careful and delicate adjustment must be made to ensure the proper degree of wedging action between the shutter blades and the narrow groove.

Another technique which has been used is to position a fixed abutment member in the path of travel of the shutter blades in conjunction with a rebound prevention pawl for engaging with the shutter blades as they abut the abutment member thereby preventing their rebound movement. This technique is disadvantageous since considerable space is needed to house the abutment member and the pawl and thus it is not possible to reduce the size of the shutter assembly to that currently desired due to the present emphasis on smaller-sized compact cameras.

It is therefore a primary object of the present invention to provide a shutter assembly for a camera which has means for preventing rebound of the shutter blades after completion of both their opening and closing movement.

It is a further object of the present invention to provide a shutter assembly for a camera which effectively overcomes the aforementioned problems and disadvantages of the prior art shutter assemblies.

It is yet another object of the present invention to provide a shutter assembly wherein the actuating levers for driving the shutter blades have flexible portions which engage with fixed projections to effectively attenuate the motion of the blades during both their opening and closing movement.

The above and other objects of the present invention are carried out by a shutter assembly comprising a plurality of shutter blades divided into a shutter-opening blade group and shutter-closing blade group. A shutter actuating means independently actuates both groups of shutter blades to effect opening and closing of a shutter aperture and the actuating means comprises a first set of generally parallel actuating levers connected to the shutter blades of the shutter-opening blade group by means of a pin-and-slot connection so that pivotal movement of the first set of actuating levers effects opening of the shutter aperture. A second set of generally parallel actuating levers is connected to the shutter blades of the shutter-closing blade group in a similar manner so that pivotal movement of the second set of actuating levers effects closing of the shutter aperture.

One lever from each set of actuating levers has a flexible portion and a fixed projection is disposed along the path of travel of each of the flexible portions to make sliding engagement therewith. The relative positions of the fixed projections and the flexible portions are such that during movement of the shutter blades to effect either opening or closing of the shutter aperture, the corresponding flexible portion engages with and rides over one of the stationary projections causing momentary flexure of the flexible portion accompanied by momentary pressing of the shutter blades against a stationary plate to thereby absorb the kinetic energy of the shutter blades and effectively attenuate their rapid movement of the shutter blades.

Having in mind the above and other objects that will be evident from an understanding of this disclosure, the present invention comprises the combinations and arrangements of parts as illustrated in the presently preferred embodiment of the invention which is hereinafter set forth in sufficient detail to enable those persons skilled in the art to clearly understand the function, operation, construction and advantages of it when read in conjunction with the accompanying drawings, wherein like reference characters denote like parts in the various views, and wherein.

Figure 1:
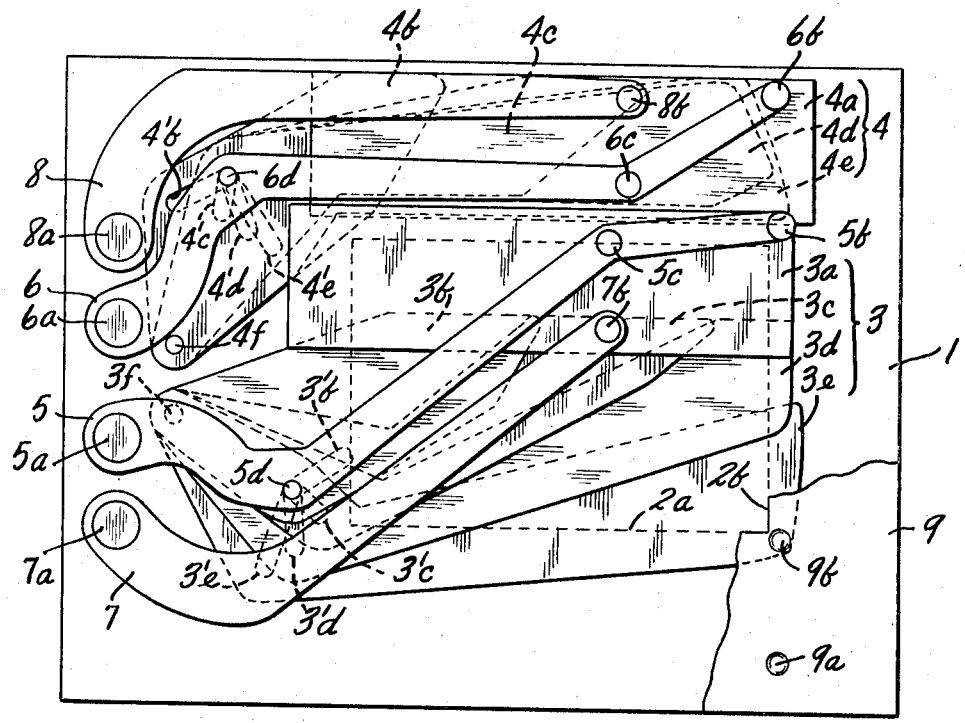
FIG. 1 is a plan view of the interior of a focal plane shutter assembly constructed in accordance with the principles of the invention and illustrating the shutter assembly in a cocked condition.

Referring now to the drawings, the focal plane shutter assembly comprises a base plate 1 constituting the major structural support member of the shutter assembly. The base plate is provided with a rectangular shutter aperture 2a which comprises a film exposure window and during use of the shutter assembly in a camera, a film to be exposed is advanced behind the exposure window in a manner well known in the art.

The shutter assembly includes two groups of shutter blades 3 and 4 and the former group consists of shutter blades 3a, 3b, 3c, 3d and 3e and comprises a shutter-opening blade group whereas the latter group consists of shutter blades 4a, 4b, 4c, 4d and 4e and comprises a shutter-closing blade group. The shutter blade 3a of the shutter-opening blade group 3 has a rectangular configuration and comprises what is known in the art as a slit-forming shutter blade which coacts with the base plate 1 to effect opening of the rectangular shutter aperture 2a in the form of a progressively increasing rectangular slit and the remaining shutter blades in this group have a more or less segmented shape. In a similar manner, the shutter blade 4a of the shutter-closing blade group 4 comprises a slit-forming shutter blade which coacts with the base plate 1 to effect closing of the shutter aperture 2a in the form of a progressively decreasing rectangular slit and the remaining shutter blades 4b–4e have a segmented shape.

A shutter actuating means coacts with the shutter blade groups to independently actuate them to effect sequential opening and closing of the shutter aperture 2a. The shutter actuating means comprises a set of opening actuating levers 5, 7 for actuating the shutter-opening blade group 3 and a set of closing actuating levers 6, 8 for actuating the shutter-closing blade group 4.

The actuating levers 5 and 7 comprise a primary actuating lever 5 mounted at one end for pivotal movement about a pin 5a, and an auxiliary actuating lever 7 mounted at one end for pivotal movement about a pin 7a, both of the pins 5a and 7a being affixed to the base plate 1. Pins 5c and 7b are provided at the other ends of the levers 5 and 7, respectively, and the slit-forming shutter blade 3a is pivotally connected to the pins 5c and 7b. By such an arrangement the actuating levers 5 and 7 are mounted for pivotal movement as a unit since the pivot points 5a, 7a and 5c, 7b are fixed relative to each other and thus the levers maintain a generally parallel disposition during their pivotal movement.

The primary actuating lever 5 has a driving pin 5d connected thereto and the driving pin slideably extends in elongated grooves 3'b, 3'c, 3'd and 3'e provided in respective ones of the segmented shutter blades 3b, 3c, 3d and 3e. The segmented shutter blades 3b–3e are arranged in superimposed stacked relationship and all of the blades are pivotally mounted about a fixed pivot pin 3f. The elongated slots 3'b–3'e have carefully selected lengths and directions which are chosen in relation to the shape and position of the segmented shutter blades 3b–3e so that pivotal movement of the actuating lever 5 in a clockwise direction in FIG. 1 will effect smooth opening of the shutter aperture 2a due to the combined effects of the pin-and-slot connections between the actuating lever 5 and the segmented blades 3b–3d and the pivotal connection of the actuating levers 5 and 7 with the slit-forming shutter blade 3a.

Figure 2:
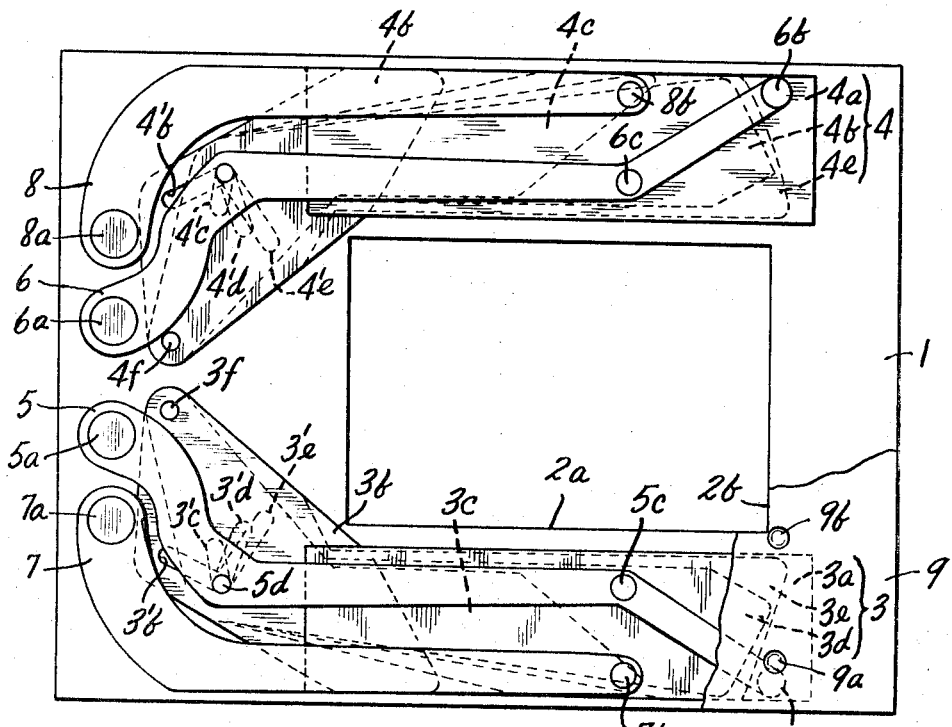
FIG. 2 is a plan view of the interior of the focal plane shutter assembly shown in FIG. 1 and illustrating the shutter assembly in an open condition.
Figure 3:
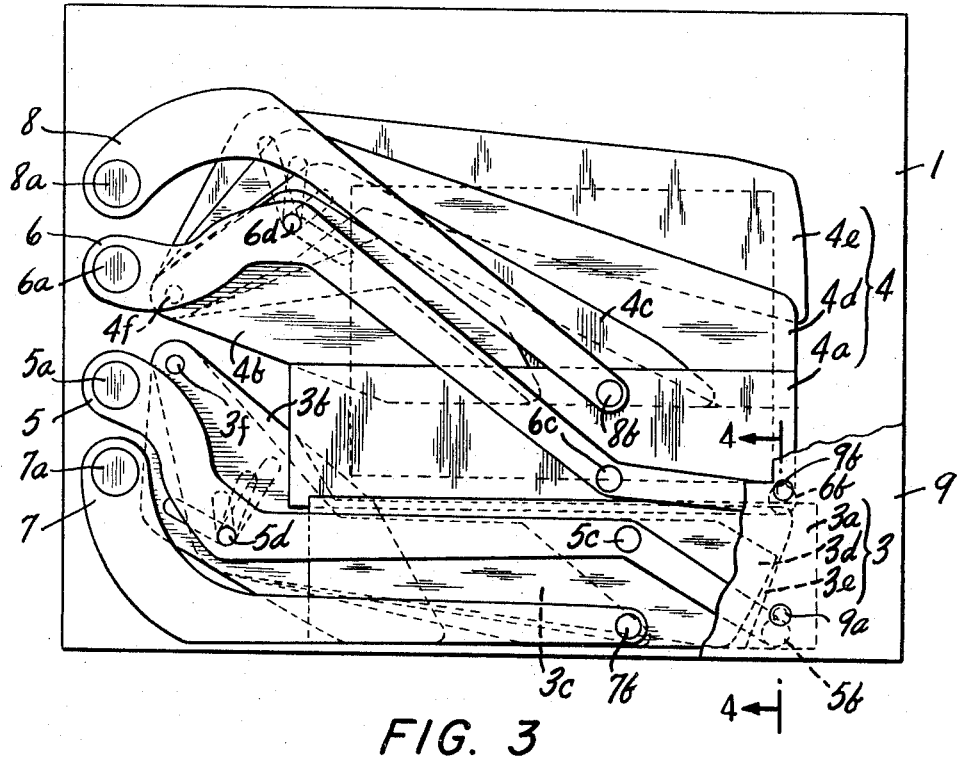
FIG. 3 is a plan view of the interior of the focal plane shutter assembly of FIG. 1 and illustrating the shutter assembly in a closed condition.

The shutter blades 3 have an extended position, as shown in FIG. 1, wherein the segmented blades 3b–3e are fanned out and coact with the slitforming blade 3a to effectively close the shutter aperture 2a in a light-tight manner. The shutter blades 3 also have a retracted position, as shown in FIGS. 2 and 3, wherein the segmented shutter blades 3b–3e along with the slit-forming shutter blade 3a are retracted out of registry with the shutter opening 2a.

The shutter-closing blade group 4 and the closing actuating levers 6 and 8 assembly comprise a mirror image of the shutter-opening blade group 3 and the opening actuating levers 5 and 7 assembly. The blade group 4 consists of a slit-forming shutter blade 4a having a rectangular shape, and a plurality of segmented shutter blades 4b–4e.

The primary actuating lever 6 is pivotally mounted about a pin 6a affixed to the base plate 1 and the auxiliary actuating lever 8 is pivotally mounted upon a pin 8a also affixed to the base plate 1. A pin 6c is connected to an end portion of the primary actuating lever 6 and a pin 8b is connected to the end of the auxiliary actuating lever 8. The slit-forming blade 4a is pivotally connected to the pins 6c and 8b and by such a construction, the actuating levers 6 and 8 move as a unit and always retain the same relative positions with respect to each other. The segmented blades 4b–4e are all pivotally mounted about a pin 4f secured to the base plate 1 and these blades have elongated slots 4'b–4'e. A drive pin 6b is secured to the primary actuating lever 6 and slides within each of the grooves 4'b–4'e to form pin-and-slot connections therewith.

The shutter actuating means 5–8 is connectable to a drive mechanism contained in the camera during use of the shutter assembly to effect forward and return movement of the shutter blade groups to complete an exposure. Such a drive mechanism is well known in the art and will not be further described here since such does not comprise part of the present invention. Suffice it to say, the drive mechanism includes a spring system for rapidly pivoting the opening actuating levers 5 and 7 in a clockwise direction in response to manual depression of a shutter release lever to effect opening of the shutter aperture and after a predetermined exposure time has elapsed, the spring system effects rapid clockwise turning of the closing actuating levers 6 and 8 to effect closing of the shutter aperture.

Figure 4:
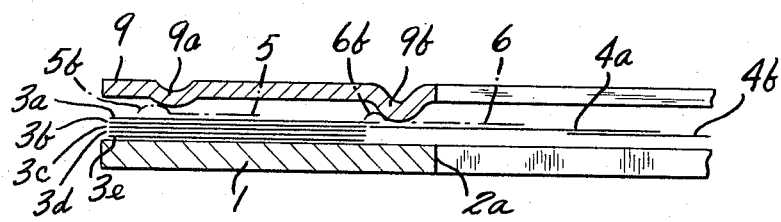
FIG. 4 is an enlarged cross-sectional view taken along section line 4—4 of FIG. 3.

In accordance with the present invention, the shutter assembly includes rebound preventing means for preventing rebound of the shutter blades after they move through their working stroke and for smoothly decelerating the motion of the shutter blades to thereby prevent jarring impacts from being imparted to the shutter assembly as well as preventing reexposure of the film due to a partial reopening of the shutter aperture. The preventing means comprises a stationary plate 9 disposed in superposed spaced relationship from the base plate 1, as best seen in FIG. 4. The stationary plate 9 is provided with an opening 2b which is similar in shape to the shutter aperture 2a and the opening 2b is in registry with the shutter aperture 2a so as not to interfere with the passage of light through the shutter aperture during the taking of an exposure.

The space between the plate 9 and the base plate 1 is made as small as possible and the shutter blades and the shutter actuating means are housed within this space. A pair of fixed projections 9a and 9b project inwardly from the stationary plate 9 towards the base plate 1 and these projections each engage with a different one of the primary actuating levers 5 and 6 in a manner hereinafter described.

The primary actuating lever 5 is provided with a flexible portion configured to slideably and frictionally engage with the projection 9a during movement of the actuating lever 5 through the end of its working stroke. In the embodiment disclosed, the flexible portion comprises a flexible lever extension terminating in a slight protuberance 5b which projects towards the fixed projection 9a and slides or rides over the fixed projection in the course of movement of the actuating lever 5 through its working stroke. In a similar manner, the primary actuating lever 6 has a flexible lever extension terminating in a slight protuberance 6b which slideably and frictionally engages with the fixed projection 9b during clockwise movement of the actuating lever 6 through its working stroke.

The positions of the fixed projections 9a and 9b relative to the protuberances 5b and 6b are preselected to ensure that the protuberance 5b only contacts the projection 9a and does not contact the fixed projection 9b during movement of the primary actuating lever 5. Likewise, the protuberance 6b only contacts the fixed projection 9b and does not contact with the fixed projection 9a. This is accomplished due to the fact that the primary actuating levers 5 and 6 are mounted for pivotal movement about different axes and thus the arcuate paths of travel of the protuberances 5b and 6b are different from each other and the fixed projections 9a and 9b are disposed in the respective paths of travel of the protuberances 5b and 6b.

A clearer understanding of the function and mode of operation of the preventing means will now be described in conjucntion with a description of the overall mode of operation of the shutter assembly. Referring to FIG. 1 which shows the shutter assembly in its cocked condition, the exposure aperture 2a is closed by the shutter-opening blade group 3 which is at this time in its extended state. The shutter-closing blade group 4 is in its retracted state and is cocked in readiness to close the shutter aperture.

When an exposure is to be taken, the camera release lever (not shown) is depressed and this action is transmitted through the drive mechanism (also not shown) to the shutter actuating means 5-8 thereby effecting clockwise pivotal movement of the opening actuating levers 5 and 7. The clockwise turning of the actuating levers 5 and 7 causes retraction of the shutter-opening blade group 3 from its extended state to its retracted state. The segmented shutter blades 3b-3e are thus driven about the pin 3f in a clockwise direction while the slit-forming blade 3a also moves in a clockwise direction but since the slit-forming shutter blade 3a is the trailing blade, the shutter aperture 2a is opened as a progressively increasing rectangular slit until the shutter aperture is completely opened as shown in FIG. 2.

As the shutter-opening blade group 3 approaches the end of the opening stroke, the primary actuating lever 5 engages with the fixed projection 9a which resiliently flexes the actuating lever 5 towards the base plate 1. More particularly, the protuberance 5b engages with and rides over the fixed projection 9a thereby flexing the lever 5 towards the base plate 1 and as the lever 5 moves towards the base plate, the individual shutter blades 3a-3e are pressed between the flexed lever 5 and the base plate 1. The frictional engagement of the protuberance 5b with the fixed projection 9a effectively decelerates the rapid opening motion of the actuating lever 5 and this action is supplemented by the frictional engagement occuring between the individual blades as they are pressed together as well as against the base plate 1. Much of the kinetic energy of the rapidly moving shutter blades is absorbed by the coaction between the fixed projection 9a and the protuberance 5b accompanied by flexure of the actuating lever 5 and the pressing of the shutter blades against the base plate 1 and thus the high speed opening motion of the shutter blades is effectively arrested and attenuated.

However, the kinetic energy of the shutter blades is sufficient to carry the protuberance 5b past the fixed projection 9a to the terminal stop position shown in FIG. 2. After reaching the stop position, the shutter blades rebound slightly due to their inertia but the energy possessed by the blade group at this time is so slight that it is effectively dampened by the rebound collision of the protuberance 5b with the fixed projection 9a. It should be understood that a major portion of the kinetic energy of the shutter blade is effectively absorbed by the frictional engagement of the protuberance 5b with the fixed projection 9a and the resulting flexure of the actuating lever 5 so that the shutter blade group 3 is prevented from rebounding past its intended stop position. The protuberance 5b and the fixed projection 9a are dimensioned relative to each other to ensure that the primary actuating lever 5 pivots through its complete stroke but any rebound of the shutter-opening blade group 3 is effectively prevented.

After the elapsing of the desired exposure time, the shutter actuating means effects clockwise movement of the shutter-closing blade group 4 to effect closing of the shutter aperture 2a. The drive mechanism (not shown) effects clockwise turning of the closing actuating levers 6 and 8 thereby effecting corresponding clockwise pivotal movement of the shutter blades 4a-4e. In this case, the slit-forming shutter blade 4a is the leading shutter blade and moves downwardly over the shutter aperture to form a progressively decreasing rectangular slit and the clockwise motion of the shutter blade group 4 is continued until the blade group reaches its fully extended position as shown in FIG. 3. The segmented shutter blades 4b-4e fan out and coact with the slit-forming shutter blade 4a to reclose the shutter aperture 2a in a light-tight manner thereby terminating the exposure.

As the primary actuating lever 6 nears the end of its working stroke, the protuberance 6b slides into frictional engagement with the fixed projection 9b. As the protuberance 6b rides over the projection 9b, the actuating lever 6 is flexed towards the base plate 1, as shown in FIG. 4, and the individual shutter blades 4a-4e are pressed against the base plate 1. In this manner, the kinetic energy of the shutter-closing blade group 4 is effectively absorbed and by the time the protuberance 6b rides off the fixed projection 9b, most of the kinetic energy has been dissipated so that no harmful rebounding of the shutter blade occurs. Of course, the inertia of the shutter blades causes them to rebound slightly from the intended stop position but the reengagement of the protuberance 6b with the fixed projection 9b effectively prevents any rebounding movement of the shutter blades.

In the embodiment disclosed, the primary actuating levers 5 and 6 are provided with protuberances at their distal ends to ensure engagement with the fixed projections provided on the stationary plate 9. However, it is not necessary to employ such protuberances as long as some other means is provided for ensuring engagement of the actuating levers with the fixed projections so that sufficient flexure of the actuating levers will occur. One alternative is to bend the actuating levers at a location somewhere between the location of the pins 5c, 6c and the end tips at which the protuberances 5b and 6b are located and this technique has proven satisfactory due to the resiliency of the actuating levers themselves. Normally the actuating levers in cameras of this type are composed of thin steel sheet which possesses sufficient elasticity and resiliency to flex in the necessary manner. This technique is also advantageous in that it maintains the individual shutter blades pressed together thereby increasing the light-tightness effect of the blades when they are in their fully extended position.

Also, depending upon the mass and the opening and closing speed of the shutter blades, the relative positions of the fixed projections 9a and 9b may vary with respect to the intended stop positions of the shutter blade groups. Moreover, though the rebound prevention device has been described in connection with a focal plane type shutter assembly, it is also useable with a central type shutter assembly by making appropriate modifications.

Thus it may be seen that the shutter assembly of the invention effectively prevents rebound of the shutter blade groups during opening and closing of the shutter aperture and such is accomplished without the necessity of employing additional parts which would require additional space. The shutter assembly constructed in accordance with the invention may be made extremely small in size and requires only a minimum number of parts yet is extremely rugged and durable and effectively prevents rebounding of the shutter blades.

The invention has been described in conjunction with one particular embodiment and it is to be understood that obvious modifications and changes may be made without departing from the spirit and scope of the invention as defined in the appended claims.

What we claim is:

1. A shutter assembly for a camera comprising: means defining a shutter aperture; a plurality of actuatable shutter blades actuatable in sequence from one state wherein they close said shutter aperture to a second state wherein they open said shutter aperture and to a third state wherein they again close said shutter aperture thereby defining an exposure; shutter actuating means for sequentially actuating said plurality of shutter blades from one state to said second state and then to said third state; preventing means momentarily engageable with said shutter actuating means during movement of said shutter blades from one of said states to another and coacting with said shutter actuating means for sufficiently attentuating the motion of said shutter blades to prevent rebounding thereof after reaching their intended state, said preventing means comprising at least one fixed projection disposed along the path of travel of said shutter actuating means, and a flexible portion comprising part of said shutter actuating means and slideable over said fixed projection and frictionally engageable therewith to effect resilient flexure of said resilient portion to a degree sufficient to press the shutter blades in a direction for causing said blades to contact each other laterally and to arrest the motion of said shutter blades.

2. A shutter assembly for a camera comprising: means defining a shutter aperture; a plurality of actuatable shutter blades actuatable in sequence from one state wherein they close said shutter aperture to a second state wherein they open said shutter aperture and to a third state wherein they again close said shutter aperture thereby defining an exposure; shutter actuating means for sequentially actuating said plurality of shutter blades from said one state to said second state and then to said third state; preventing means momentarily engageable with said shutter actuating means during movement of said shutter blades from one of said states to another and coacting with said shutter actuating means for sufficiently attentuating the motion of said shutter blades to prevent rebounding thereof after reaching their intended state; said plurality of shutter blades comprising a first group of shutter-opening shutter blades actuatable from an extended position wherein they close said shutter aperture to a retracted position wherein they open said shutter aperture, and a second group of shutter-closing blades actuatable from a retracted position wherein they open said shutter aperture to an extended position wherein they close said shutter aperture; said shutter actuating means comprising a first set of pivotal actuating levers coacting with said first group of shutter blades to effect actuation thereof from its extended state to its retracted state in response to pivotal movement of said first set of actuating levers, and a second set of pivotal actuating levers coacting with said second group of shutter blades to effect actuation thereof from its retracted state to its extended state in response to pivotal movement of said second set of actuating levers; and said preventing means comprising a flexible portion of one actuating lever in each of said sets, and fixed projections disposed along the path of travel of each flexible portion and slidingly engageable therewith during pivotal movement of the corresponding actuating lever to effect resilient flexure of each corresponding resilient portion to a degree sufficient to press the shutter blades in a direction for causing said blades to contact each other laterally and to sufficiently arrest the movement thereof to thereby prevent rebounding of the corresponding shutter blades upon reaching their intended position.

3. A shutter assembly according to claim 2, wherein each said flexible portion of a corresponding actuating lever includes a protuberance projecting outwardly toward said fixed projection and slideable thereover and cooperative therewith to arrest the motion of said one actuating lever during forward movement thereof and engageable therewith upon return movement of said one actuating lever to prevent rebounding of said corresponding shutter blades from their intended position.

4. A shutter assembly according to claim 2, including a base plate having mounted thereon said shutter blades and said shutter actuating means; and wherein said fixed projection is dimensioned to effect resilient flexure of said flexible portion to a degree sufficient to press said corresponding shutter blades against said base plate to thereby further attentuate the movement of said one actuating lever.

* * * * *